May 1, 1928.
D. HANDELAN
GREASE GUN
Filed Oct. 23, 1922
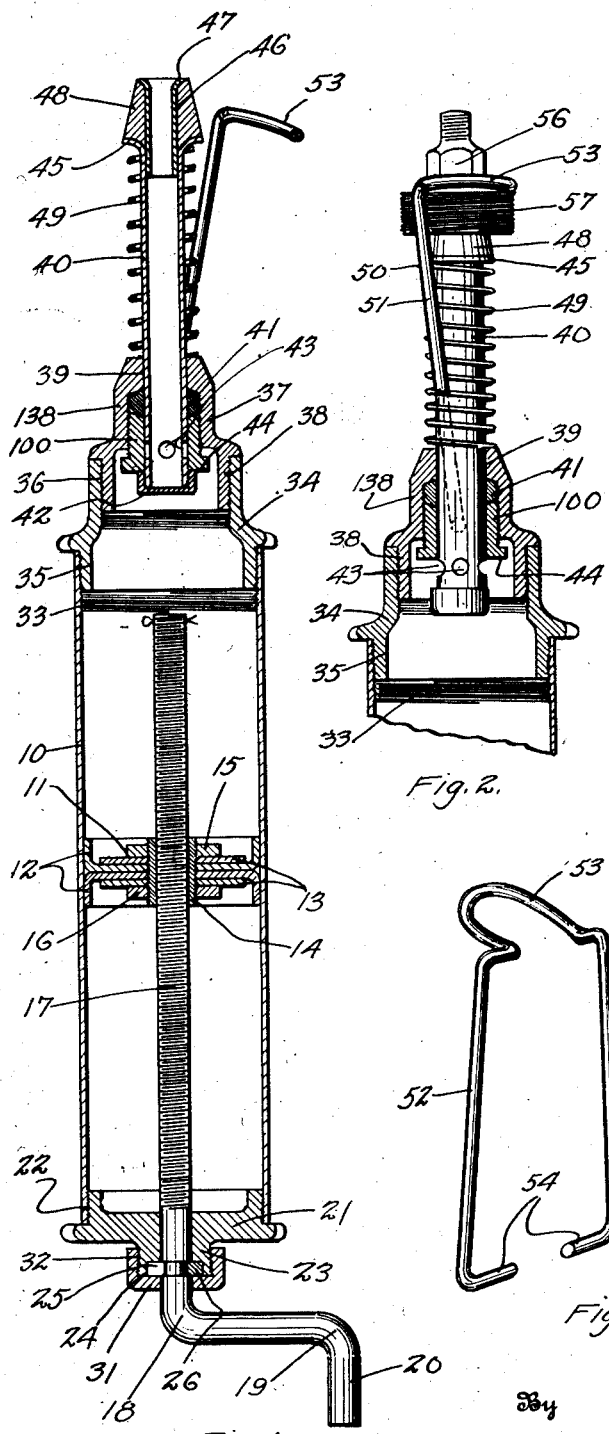
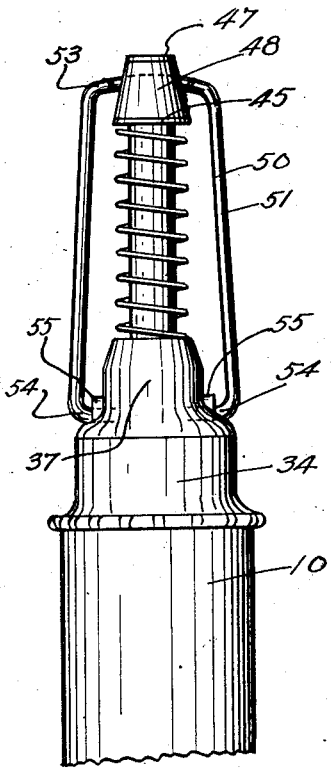
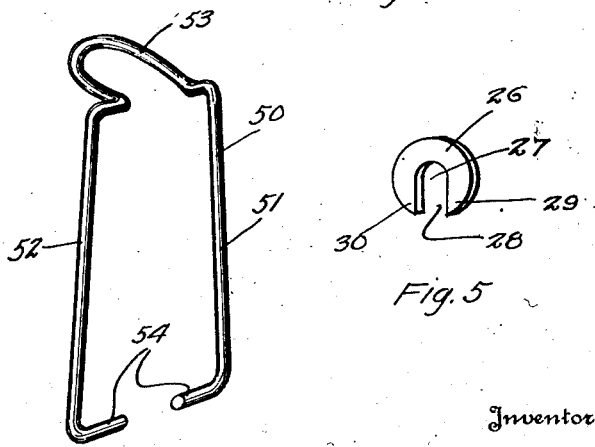
Inventor
Daniel Handelan
By Fischer & Lagaard
Attorneys Patented May 1, 1928.

1,667,782

UNITED STATES PATENT OFFICE.

DANIEL HANDELAN, OF MINNEAPOLIS, MINNESOTA.

GREASE GUN.

Application filed October 23, 1922. Serial No. 596,221.

My invention relates to grease guns and has for its object to provide a high pressure grease gun which may readily be attached to ordinary grease cups such as are now found on motor vehicles, tractors and other machinery.

Another object of the invention is to provide a grease gun having connecting means for attaching the same to the hub or differential cup of the vehicle so that all of the parts requiring greasing may be greased by this one device without alteration of the parts ordinarily furnished with the vehicle.

Another object of the invention is to provide means for manipulating the plunger of the gun, whereby the said means at all times projects the same distance outwardly beyond the end of the gun.

Another object is to provide said plunger with a threaded rod terminating in a crank handle which rod is formed with a groove having a slotted washer secured thereto, said washer being lodged in a recess formed in the cap of said gun, which washer is held in position by a cover secured thereto.

Another object is to form said gun of a size such that the same may be secured upon the exterior of the hub of a vehicle wheel and to attach to said gun a suitable bushing by means of which the gun may be attached to any of the other greasing devices of the vehicle without alteration thereof.

A still further object is to provide a slidable head having grease inlets therein, which are adapted to become opened for the passage of grease in said head when the same is forced inwardly against the action of a coil spring and are adapted to become closed upon releasing the said head.

Another feature of the invention resides in providing said slidable head with a nozzle adapted to tighten against the opening of an ordinary grease cup and to provide a swinging latch adapted to engage under the grease cup when the same is applied thereto for holding the gun securely in place.

The full objects and advantages of my invention will appear in connection with the detailed description thereof and are particularly pointed out in the claims.

In the drawings, illustrating the application of my invention in one form:—

Fig. 1 is a longitudinal sectional view of my improved grease gun.

Fig. 2 is a view similar to Fig. 1 of a portion of the grease gun showing the same attached to an ordinary grease cup.

Fig. 3 is an elevational view of a portion of the gun shown in Fig. 1.

Fig. 4 is a perspective view of the fastening member used for attaching the gun to the grease cup.

Fig. 5 is a perspective view of the washer used in holding the operating structure from longitudinal movement.

My grease gun proper, as best shown in Fig. 1, comprises a tubular cylinder 10 within which is slidably mounted a piston or plunger 11. This plunger consists preferably of two leather disks 12 which are mounted together with two metal washers 13 upon a sleeve 14 and are held in place thereon by means of two nuts 15 and 16. This structure forms a compact plunger which is adapted to draw into or to eject from the said cylinder 10 the grease as required. Plunger 11 is slided within the cylinder by means of a threaded rod 17 which is screwable into the sleeve 14. The extreme end of rod 17 is bent at 18 and 19 to form a crank handle 20 by means of which said rod may be rotated to cause piston 11 to be reciprocated within cylinder 10. For holding rod 17 from longitudinal movement relative to cylinder 10, I employ a cap 21 which is screwed into the end of cylinder 10 as indicated at 22. This cap is formed with a boss 23 extending outwardly from the same which in turn is provided with a recess 24 formed in the center of the same. As will be seen in the Fig. 1, the shank of the rod 17 is turned down to form an annular groove 25 which is positioned in proximity to the recess 24 in boss 23. Within this groove is positioned a washer 26 which is formed with a central hole 27 and a slot 28 communicating therewith, as clearly shown in detail in Fig. 5. This washer is slided into the groove 25 on rod 17 and the extreme ends 29 and 30 thereof pounded slightly together after the said washer has been applied which causes the said washer to be permanently and rigidly attached to said rod.

A cover 31 threaded at 32 is adapted to screw upon the boss 23 to hold the washer 26 lodged within the recess 24 so that the rod 17 may rotate freely relative to the grease gun but is absolutely prevented from longitudinal movement relative to the same.

As before stated, my improved grease cup is adapted to be used for greasing all of the portions of a motor vehicle requiring greasing without alteration thereof. To enable me to grease the front wheels of a motor vehicle, I form the cylinder 10 of a suitable diameter and thread the same internally at 33 to screw upon the hub of the vehicle for which the gun is designed. By this means, I can very quickly fill the entire wheel with grease which otherwise is a slow and laborious task. In some vehicles, the universal joint is greased by a grease cup of very large dimensions. To enable me to use my grease gun in connection with this grease cup, I provide a bushing 34 which is provided with a threaded neck 35 adapted to screw into threads 33 of cylinder 10. This bushing is further internally threaded at 36 to screw over the required grease cup of the universal joint of the motor vehicle. It can readily be comprehended that the bushing 34 may be made of any desired dimension so that the gun will feed any required greasing device of dimensions larger than the ordinary grease cup.

The structure for greasing the ordinary grease cup is shown in detail in Figs. 1 and 2. A head 37 is formed with a threaded neck 38 adapted to screw into the threads 36 in bushing 34. This head is provided with a boss 138 formed with an internal bore 39, in which a tube 40 is adapted to slide. A stuffing box 41 is provided in combination with the head 37 for forming a tight connection between the tube 40 in said head, so that the leakage of grease through the sliding connection is prevented. This box is formed with a member 100 which is screwed into the device from the interior so that the tube 40 and other parts connected therewith may be readily assembled. On the other end of the tube 40 is permanently secured a cap 42 which completely closes off the passage of grease into said tube from the end of the same. Adjacent the said cap is drilled a number of holes 43 through said tube which are for the purpose of permitting grease to enter the said cap when required. It can readily be seen that when the tube 40 is positioned within head 37 so that the cap 42 comes up against the shoulder 44 formed in said head and the holes 43 extend entirely within the bore 39 that the passage of grease into the tube 40 is absolutely obstructed. When on the other hand, the tube 40 is forced inwardly, as shown in Fig. 2, grease is permitted to be forced through the openings 43 and into the said tube 40 where the same may be discharged wherever required.

The nozzle for connecting my improved grease gun to the ordinary grease cup is shown in detail in Fig. 1. The extreme end 45 of tube 40 is flanged outwardly, as shown, and an auxiliary tube 46 is inserted into the end 40 and soldered in place. This tube also has its extreme end 47 flared outwardly therefrom to form two flanges between which a suitable gasket 48 may be positioned. A coil spring 49 is seated between the stuffing box 41 and flange 45 and serves to hold the tube 40 in its outward position with the openings 43 closed.

In using my invention, the nozzle of the same is forced into the grease cup with the gasket 48 engaging the sides thereof. This causes the coil spring 49 to be compressed and the said tube 40 to be forced inwardly, so that grease may pass through the openings 43 and through the said tube and nozzle.

For holding the parts in relative position, I provide a keeper, such as shown in Fig. 4 at 50, which keeper is formed with a pair of longitudinal legs 51 and 52 connected by a looped neck 53 and terminating in inwardly turned ends 54. The legs 51 and 52 are adapted to straddle the tube 40 and head 37, while the ends 54 are adapted to be hooked into two bosses 55 formed on the sides of said head 37, so that the keeper 50 may be oscillated toward or away from the nozzle of the gun. The neck 53 is so constructed that when the tube 40 is forced inwardly sufficiently to permit of the flow of the grease, as shown in Fig. 2, the neck 53 may engage the portion 56 of a grease cup 57, as shown in this figure, to securely hold the said grease gun connected therewith. In this manner, the grease gun is securely attached to the grease cup, so that, upon rotating the crank handle, grease may be readily forced through said cup and to the bearing to be greased.

The advantages of my invention are manifest. The device may be used in conjunction with the grease cup and other greasing devices furnished with motor vehicles without requiring replacing of any greasing device or substantial alteration therein. My grease gun further provides means for greasing portions of the motor vehicle which, heretofore, have only been greased by hand and not through a high pressure system. In addition, the operating handle at all times projects outwardly beyond the grease gun the same amount so that a neat, compact device is provided and the difficulty of handling an extended handle is eliminated.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. A grease gun comprising a cylinder, a head secured thereto, a nozzle issuing outwardly from said head adapted to slide inwardly into said head, spring means for normally holding said nozzle in its extreme outward position and a keeper pivoted to said head near its connection with said cylinder having an axis at right angles to said cylinder formed at its extreme end with a U-shaped portion, said keeper being adapted to swing toward or away from said nozzle to engage behind a grease cup when said nozzle is inserted therein.

2. A grease gun comprising a cylinder, a head secured thereto, a nozzle issuing outwardly from said head adapted to slide inwardly into said head, spring means for normally holding said nozzle in its extreme outward position, a pair of arms positioned on each side of said nozzle pivoted to said head near its connection with said cylinder and extending outwardly along said nozzle, said arms being adapted to swing toward or away from said nozzle and a U-shaped engaging member formed upon the end of said arms.

3. A grease gun comprising a cylinder, a head secured thereto, a nozzle issuing outwardly from said head adapted to slide inwardly into said head, spring means for normally holding said nozzle in its extreme outward position, oppositely facing bosses formed on said head near its connection with said cylinder, a pair of arms extending along said nozzle, inwardly turned trunnions formed on said arms adapted to be pivotally supported in said bosses and a U-shaped engaging member formed at the extreme ends of said arms adapted to swing toward or away from the end of the nozzle of said grease gun to engage behind a grease cup when said nozzle is in engagement therewith.

4. A grease gun comprising a cylinder, a cap secured thereto, a boss formed on said cap having a recess, a threaded spindle extending through said cap of uniform diameter throughout its length passing through said cap, an annular groove formed in said spindle, a U-shaped washer adapted to be inserted within said groove and seated within said recess and a cover screwable upon the end of said boss for holding said washer clamped in position and attached to said cap.

5. A grease gun comprising a cylinder adapted to be grasped manually, a nozzle mounted upon the end of said cylinder and adapted to engage into a grease cup, a pivoted member having a loop adapted to be engaged behind said grease cup and spring means cooperating with said nozzle for forcing said nozzle into said grease cup.

6. A grease gun including, a reciprocal tubular nozzle, means for opening said nozzle by pressing the same inwardly, a packing adapted to form the outer connecting end of said nozzle, and a wire yoke-like loop connector adapted to hold said nozzle in operative position to form a grease tight joint.

In testimony whereof I affix my signature.

DANIEL HANDELAN.